United States Patent

[11] 3,612,203

[72] Inventor  Floyd W. Kuecker
               1620 S. 29th St., La Crosse, Wis. 54601
[21] Appl. No. 852,771
[22] Filed     Aug. 25, 1969
[45] Patented  Oct. 12, 1971

[54] WHEELED IMPLEMENT
     9 Claims, 6 Drawing Figs.
[52] U.S. Cl. .................................................. 180/25,
                              15/93, 74/220, 104/244.1
[51] Int. Cl. .................................................. B65f 3/00
[50] Field of Search ........................................ 74/220;
                    15/93 B; 180/25, 27, 70; 104/244.1

[56]              References Cited
                UNITED STATES PATENTS
1,803,186  4/1931  Hendrickson ................  74/220
3,121,502  2/1964  Schroeder ....................  180/25 X
3,360,999  1/1968  Mullet ..........................  74/218

*Primary Examiner*—Leon G. Machlin
*Attorney*—Schroeder, Siegfried & Ryan

ABSTRACT: A wheeled implement and an improved power transmission for employing a gasoline engine or equivalent unidirectional rotating power source in which a lever-mounted belt-drive system is positioned in contact with a pulley on an output shaft of the engine selectively at varying points thereon and held in contacting relationship therewith to impart rotation to the belt system which is coupled through positive drives to the wheels of an implement. The implement includes a scraper blade which is adjustably positioned about portions of the frame and the structure is guided by means of additional guide wheels positioned on the frame and contacting a portion of the surface to be worked.

INVENTOR.
Floyd W. Kuecker
BY
Schroeder Siegfried & Ryan
ATTORNEYS

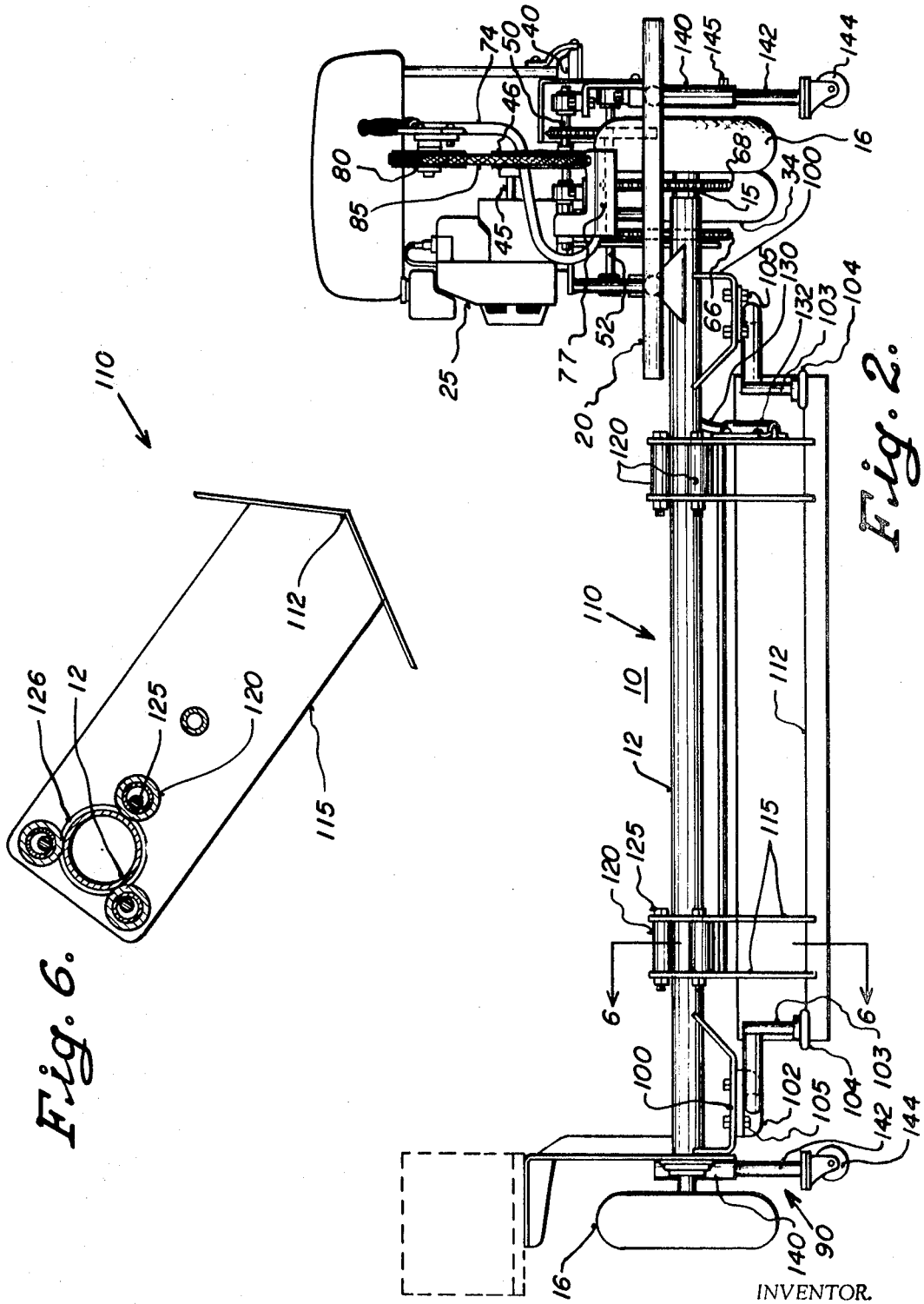

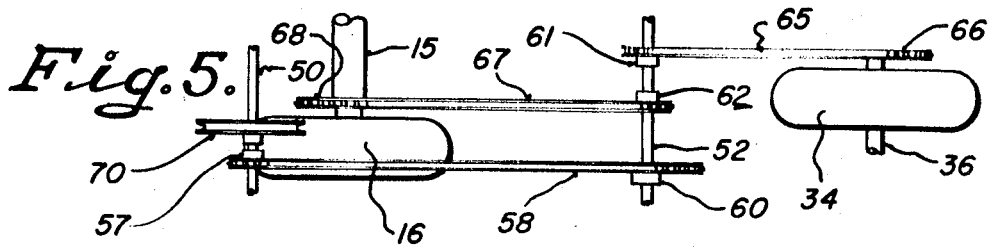
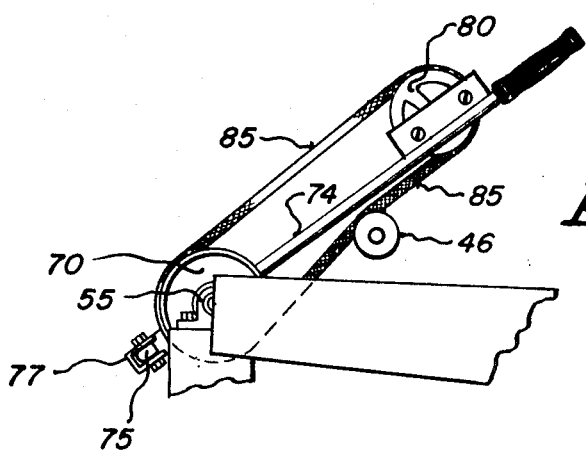
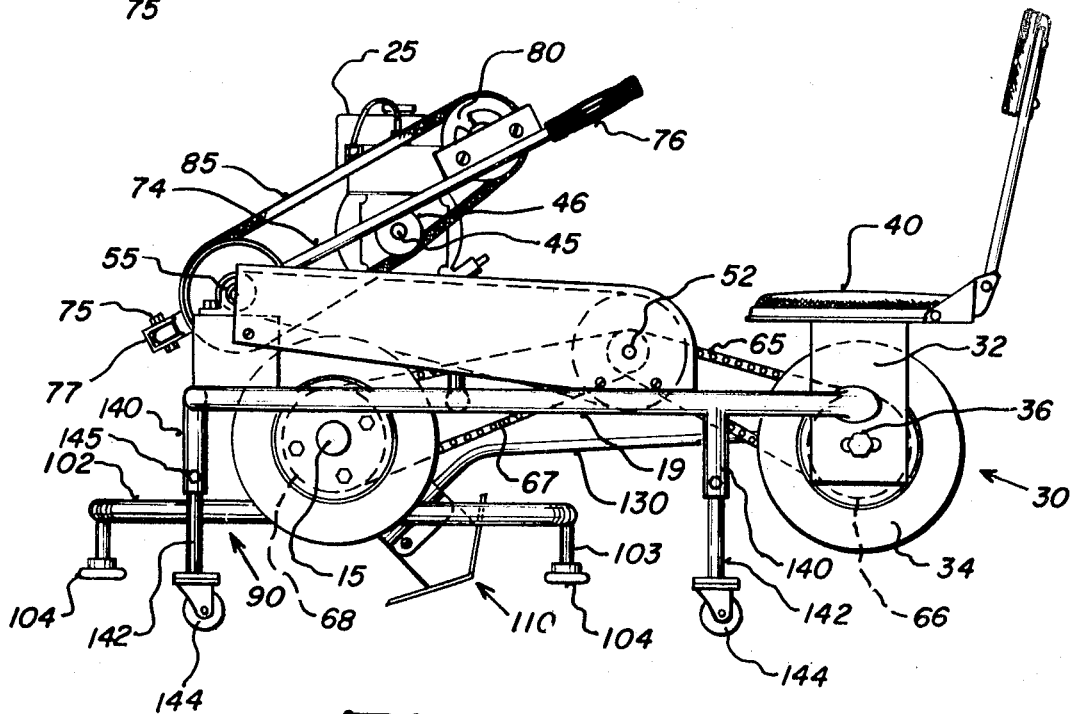
INVENTOR.
Floyd W. Kuecker
BY
Schroeder Siegfried & Ryan
ATTORNEYS

WHEELED IMPLEMENT

My invention relates to a wheeled implement and more particularly to an improved wheeled implement having a simplified power transmission for operation of the same.

Motorized vehicles, implements, and the like and the power transmissions for the same are presently being constructed and sold and used in a variety of forms, depending upon the requirements of the same. Such implements have in common a motorized source and driving wheels with a power train connection therebetween and provision for carrying some type of working tool on the surface thereof. The power source may or may not be connected to the working tool. Generally when the motive source is an internal combustion engine, the output rotation or shaft of the same is nonreversible and complex gearing or power transmissions are required to impart reversible rotation to the driving wheels.

The present invention is directed to an improved wheeled implement of the type incorporating a unidirectionally rotatable motive source, such as a gasoline engine, and with provisions for driving or rotating drive wheels for the implement in reversable directions for forward and reversing motion thereof. This improved implement includes a simplified mechanically operated power transmission operated by a pivoted lever which incorporates a belt-drive system manually brought in contact with the output shaft of the gasoline engine at selectively varying points thereon to obtain a reversal in direction of rotation to the belt system and hence the wheel drive. Further, the improved implement is a simplified structure designed particularly for a scraping operation and in particular for a chickenhouse cleaner with provisions for guiding the implement in the normally trenchlike path structures of a commercial chickenhouse for the purpose of cleaning the same. The structure incorporates provision for guiding the implement without specific steering provisions and castering for moving the implement when not in use. In addition, the implement is designed to operate in both directions with respect to the drive source and the working tool mounted thereon.

Therefore, it is the principal object of this invention to provide an improved wheeled implement.

These and other objects of this invention will become apparent from a reading of the attached description together with the drawings, wherein:

FIG. 2 is a front elevation view of the wheeled implement of FIG. 1;

FIG. 3 is a right side elevation view of the wheeled implement of FIG. 1 showing the power transmission means positioned for one direction of movement of the implement;

FIG. 4 is a fragmentary elevation view of the implement showing the power transmission means in a position for an opposite direction of implement movement;

FIG. 5 is a schematic view of a portion of the power transmission of the improved wheeled implement; and FIG. 6 is a sectional view of the wheeled implement of FIG. 1 taken along the lines 6—6 therein and showing the mounting of a working tool therein.

Figure 1:
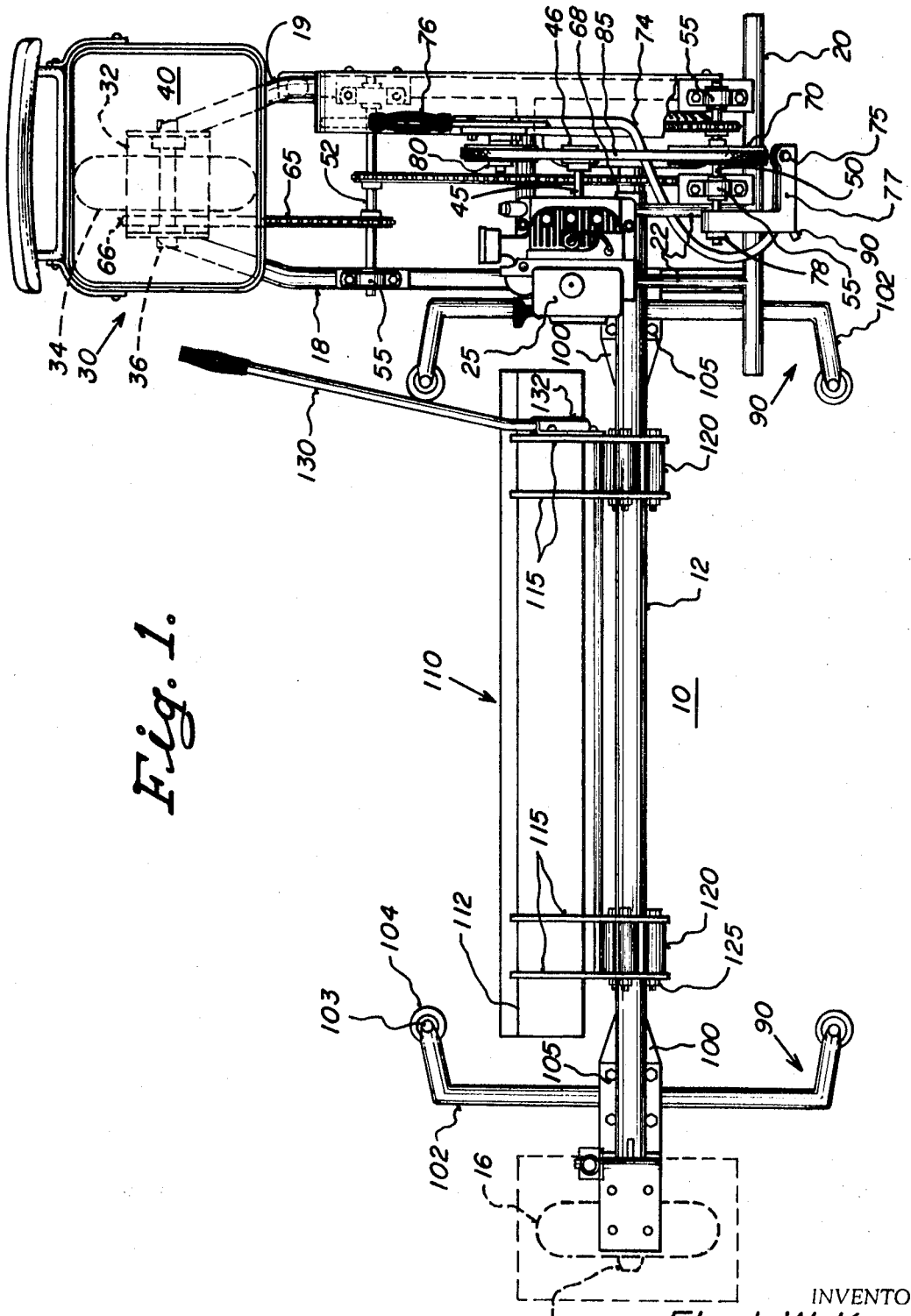
FIG. 1 is a plan view of an improved wheeled implement embodying my invention.

My invention in a wheeled implement and a power transmission therefor is shown in the drawings in connection with a powered scraper particularly adapted for use in large poultry or chickenhouses or hatcheries wherein roost and nest areas are separated and in which the roost areas are elevated on screening or equivalent supporting structure permitting droppings from the poultry to fall into a particularly designated floor area in the building which is recessed for ease in cleaning. Thus, in such structures, a single or plurality of recessed or channel areas in the supporting floor is the surface area in which the droppings are confined for ease in cleaning of the building and such droppings are removed by scraping and otherwise plowing the area and moving the accumulation to a point where they may be removed from the building through automatic equipment, such as augers or conveyors in the cleaning operation of the building. Thus, the improved wheeled implement is particularly designed to operate in such areas and under such conditions in that it is nonsteerable and is guided within the recessed surfaces by contacting the sides of the same with the driving wheels positioned above or on surfaces outside of the recessed area. In addition, the working tool or plow blade is particularly adapted to fit within the recessed area and extend across the width of the same for effective cleaning operation with the implement being movable in two directions and the plow blade being adjustable to be positioned for working in both directions in such a cleaning operation, as will be hereinafter described.

My improved wheeled implement, as shown in FIGS. 1, 2 and 3, includes a multipart frame structure 10 connected together to give the apparatus the desired shape. Thus, in FIGS. 1 and 2, a first portion of the frame structure includes a tubular frame member 12 having a driving shaft 15 extending therethrough and being suitably journaled therein through means (not shown) with a pair of front supporting wheels 16 connected to the driving shaft or axle 15. The frame includes, in addition, a generally rectangular frame structure attached to the tubular member 12 and defined by a pair of side frame members 18, 19 and a connecting frame part 20 with an elevating support frame structure 22 secured thereto. This structure is connected to the tubular frame part 12 by suitable means, such as welding, and the end of the tube parts are similarly connected together to provide an overall composite frame for the mounting of the drive engine, indicated generally at 25, and the rear driving wheel structure, indicated generally at 30. The wheel structure 30 is positioned to one side of the tubular frame member and is generally aligned with one of the driving wheels 16. The frame parts 18, 19 connect to a suitable bifurcated flange 32 which mounts the rear wheel 34 of the rear driving wheel structure through a suitable axle, such as is shown at 36. Positioned on the bifurcated frame 32 is a seat 40 to permit an operator to ride on and operate the implement. Engine 25 is a conventional gasoline engine having an output shaft 45 upon which is mounted a drive pulley 46 with this structure being elevated generally above the profile of the frame parts and connected thereto. The gasoline engine has a unidirectionally rotating shaft from which a suitable power transmission selectively connects thereto and imparts reversible rotation to the driving wheels of the implements, as will be hereinafter defined.

As will be best seen in FIG. 5, the frame structure mounts a pair of jackshafts 50 and 52, each of which are journaled on the frame structure through suitable bearing support, such as is indicated generally at 55 (see FIG. 1). The first jackshaft 50 mounts a sprocket 57 which is drivenly connected to the second jackshaft 52 through a suitable chain drive or chain link structure 58 fitting over a second sprocket 60 mounted on the jackshaft 52 and secured thereto. The jackshaft 52 mounts a pair of additional sprockets 61, 62, each of which are connected respectively to drive axles 15, 36 for the wheels. The sprocket 61 is connected through a chain 65 to a sprocket 66 which connects to the drive axle 36 of the rear wheel 34, and the sprocket 62 is connected through a link chain 67 to the drive axle 15 through a sprocket 68. Thus, the wheels 16 on the axle 15 are driven from the jackshaft 52 through the drive including the sprocket 62 to 68 and the chain 67 while the rear wheel is similarly driven through these sprockets 61, 66 and the chain 65. The jackshaft 50, in addition, mounts a pulley 70 by means of which rotation is aparted to the jackshaft 50 for the driving rotation imparted to the wheels through the chain and sprocket transmissions. This pulley forms a part of a power transmission coupling, the output shaft 45 of the engine 25 or the pulley 46 thereon which is operated through a manually movable lever.

As will be best seen in FIGS. 1 and 2, a lever 74 having a handle 76 at one extremity of the same and which is generally curved along its extent is connected at its opposite extremity through a pivot structure 75 to an L-shaped crank member 77, the crank member in turn being rotationally mounted at its free extremity on an extension of the jackshaft 50 for movement about an axis normal to the axis of the pivot structure 75.

Thus, in FIG. 1, the crank member 77 is mounted through a suitable journal 78 on the end of the jackshaft 50, and the free extremity of the lever 74 near the handle 76 mounts a pulley 80 over which is positioned a belt 85 with the belt also encircling the pulley 70 on the jackshaft 50. The pulleys 46 on the engine and the pulley 70 on the jackshaft 50 are in substantial alignment with respect to the longitudinal axis of the implement and the pivoted lever 74 may be movable about the axis of pivot structure 75 to move the pulley 80 on the lever 74 from a position of alignment with the pulleys 70 and 46 to a position to one side of the same. Similarly, the journal 78 permits the lever 74 to move the pulley 80 and hence the belt 85 thereon about an axis which is generally parallel to the axis of the motor and coincident with the axis of the jackshaft for the purpose of raising and lowering the lever and hence the belt and pulley thereon with respect to the pulley on the end of the motor shaft 45. As will be seen in the drawings, the lever is curved along its extent and passes through the opening between the pulleys 70 and 46 and the belt thereon curving around the bellcrank 77 and its pivot of journal 78 to the point where it is pivotally connected, as at 75, to the bellcrank. This mounting restricts lateral movement or sidewise movement of the lever out away from the end of the motor shaft and its pulley 46 inasmuch as the lever will contact the bellcrank and its pivot if moved through too wide a range of lateral movement in this direction. Similarly, the bellcrank includes a flange 90 at the corner of the same which operates as a limit of movement to the lever toward the motor and its output shaft.

Whenever it is desired to transmit motion through the power transmission or the belt drive from the gasoline engine, a portion of the belt 85 is brought into contact with the pulley 46 on the end of the shaft so that a driving connection is made between the belt 85 and this pulley 46 to cause rotation of the belt 85 and hence rotation of the jackshaft 50 with corresponding rotation of the jackshaft 52 and the axles 15 and 36 coupled thereto. FIG. 3 shows a position of the lever in which the belt 85 is brought into contact with the under surface of the pulley and the inner surface of the belt is drivenly engaged by the pulley 46 to cause a forward direction of rotation to the vehicle. It is necessary for the operator to manually hold the lever 74 urging it in the direction to cause the belt 85 to bear against the pulley 46 to decrease slippage and insure this driving connection. Thus, speed and direction of motion is controlled by the operator by positioning of the lever relative to the pulley on the engine shaft. The particular belt 85 will have a double contacting surface inside and out so that it may contact the output shaft pulley on both surfaces thereof for reverse and forward driving directions.

In FIG. 4, it will be seen that the belt 85 is brought into contact with the pulley 46 on substantially the diametrically opposed side of the pulley from that of the driving connection shown in FIG. 3 to provide a reverse direction of motion of the implement. The lever is positioned relative to the output shaft of the engine and the pulley thereon by raising or lowering the lever and hence the belt away from contacting engagement with a pulley on the engine shaft, then moving the lever 75 sidewise or translational to the driving connection of the belt to clear the pulley 46 after which the lever will be raised or lowered depending upon what surface of the output shaft pulley 46 is to be contacted or what direction of motion is to be obtained from such positioning of the lever 74. As in the forward direction of the drive of the implement, the operator must, for the reverse direction of drive, hold the lever 74 in such a manner that the belt engages the upper surface of the pulley and fits snugly against the same to eliminate slippage and transmit rotation from the engine output shaft 45 through the pulley 46 and belt 85 to the jackshaft 50 and the drive axles connected thereto through the chains and secondary jackshaft 52.

It will be understood that the actual driving relationship or arrangement beyond the initial jackshaft 50 may vary and this jackshaft may be directly coupled to the axles through belts or chains or gearing, as desired.

The implement in the preferred form is nonsteerable and is guided in the particular application by guide rollers, indicated generally at 90, which are attached to the frame. Thus, as will be best seen in FIGS. 1 and 2, the tubular member 12 has attached thereto and on the bottom side thereof, platelike mounting brackets 100 which may be welded or otherwise suitably secured to the tubular member. The brackets mount a U-shaped guide frame 102 having downwardly extending flanges 103 at the ends of the same upon which are positioned guide rollers 104. The brackets attach to the mounting flanges through an adjustable-type connection, such as is indicated at 105, to permit spacing of the guide supports 102 with respect to the tubular member to adjust the position of the rollers for varying width troughs or recesses for the particular cleaning application. These contacting rollers 104 will be positioned below the surface of the tires or wheels 16 and 34 for the particular application.

The working tool on the wheeled implement is a plow blade, indicated generally at 110, which plow blade is an elongated platelike structure bent at its midpoint so that the sides thereof form an obtuse angle to one another, such as is indicated at 112 in FIG. 6. Attached to the plow blade and at each end of the same are a pair of mounting plates 115 which are connected to the blade through any suitable means, such as welding, with the plates 115 serving to mount the blade on the tubular member, as will be best seen in FIG. 6. The free extremities of the plates 115 remote from the blade 110 have tubular roller members 120 positioned therebetween with the roller members being held in position between the plates and mounting the plates on the tubular member 12 by means of bolts, indicated at 125, which extend through the center of the same and mount a nut on the threaded extremity of the same to hold the roller members 120 in position between the plates and to hold the plates in assembled relationship. It will be noted in FIG. 6 that the plates have an aperture 126 therein which is larger than the outer diametrical dimension of the tubular member 12 so that the roller members will be the contacting surface between the tubular member 12 and the plates 115 to permit positioning of the plates and hence the plow blade 110 relative to the tubular member through rotary or arcuate movement thereon. Each end of the plow blade 110 is so mounted on the tubular member and the plow blade is positioned between the extremities of the tubular member and the guide rollers 104 to be equidistantly spaced therefrom. The guide rollers 120 will perform a contacting relationship to space the ends of the plow blade from the recessed surface being cleaned so that only the bottom or scraping edge thereon will contact the same. Further, it will be noted that the angle in the plow blade or the bend in the same is such that the blade in contacting relationship with the ground or surface being cleaned will be positioned at a small acute angle relative thereto for improved lifting operation of the debris being cleaned with the opposite edge or half of the blade forming a hoe section to move the debris lifted and picked up by the blade on the blade in the cleaning operation. The blade is adjustably positioned relative to the tubular member through a handle 130 which is positioned in a tubular handle holder 132 attached to one of the mounting plates 115 for the plow blade. When desired, the plow blade may be rotated about the surface of the tubular member 12 to a position on the opposite side of the same for working in an opposite direction. Under such circumstances the handle 130 will be removed from the tubular holder 132 and to be positioned on the opposite side or through the opposite end of the tubular member to permit raising and lowering of the blade. The extremity of the handle 130 is within proximity of the operator or the operator seat 40 such that it may be raised or lowered in the scraping or cleaning operation.

The improved wheeled implement of the present disclosure is particularly adapted for use in a location where it is guided by means of roller guides on the implement for movement over a predetermined path backward and forward and to perform a cleaning function with said movement. As such, no specific or adjustable steering mechanism is incorporated therewith. Whenever it is desired to transport the implement or to move it to a new location or usage, casters may be installed thereon which elevate the wheels and the guide structure together with the plow out of contact with the ground so that the same may be moved by manually pushing the same to a desired location. Thus, as will be seen in FIGS. 1, 2 and 3, the frame includes downwardly projecting tubular flanges 140 secured to at least three points thereon by suitable means, such as welding, which flanges are adapted to mount a caster structure including a tubular pipe extension 142 with a conventional roller caster 144 at the extremity of the same, the pipes being adapted to be positioned in the tubular brackets or support by slidably fitting into the same and secured therein by a pin, such as is indicated at 145, extending through an aperture in the tubular support and the pipe. Such casters are installed or removed by manually lifting or raising the frame of the machine and inserting or removing the same. When installed, the machine will be elevated such that only the caster wheels will be in contacting relationship with the surface upon which the implement is positioned so that it may be rolled to a desired location for usage. Once in this location, the casters or pipes are removed and the implement positioned for the particular application above and with the wheels on each side of a recess which is to be cleaned. With such a structure, the guides 90 will be positioned in contacting relationship with the sides of the recess, normally a concrete recessed flooring, so that the guides may steer or guide the implement as it is moved through rotation of the wheels which are in contact with the surface above the recess. The plow blade 110 or implement blade may be adjustably positioned for a scraping operation and raised for an unloading operation or reversed in its position with respect to the tubular frame upon which it is mounted so that the implement may work or scrape in both directions. The implement is operated by an operator manually adjusting the position of the lever or handle 74 to have the belt 85 connected with the lever system contacting the output pulley 46 on the shaft of the gasoline engine powering the implement. When the belt is in contacting relationship with one surface of the pulley, one direction of motion is imparted to the driving system and a reverse direction of motion is produced by repositioning the lever and hence the belt to contact an opposite surface of the drive pulley. It will be understood that the improved drive system may be applied to steerable type implements by making certain of the wheels of the same steerable and that it is not required that all wheels be drivenly connected to the implement. Further, it will be understood that the implement may carry different types of working tools which would be mounted in a different manner than that disclosed in the present disclosure.

What is claimed is:

1. A wheeled implement comprising, a frame, a motive source having a rotary output shaft mounted on the frame, a drive pulley mounted on the output shaft, a jackshaft journaled on the frame, a driven pulley mounted on said jackshaft, a manually operated coupling means pivotally mounted on the frame at one extremity for movement about a pair of displacement axes and having an idler pulley journaled near the opposite extremity of the same, belt drive means positioned over and around the idler pulley and the pulley on the jackshaft with the drive pulley of the output shaft of the motive source positioned between the pulley on the jackshaft and the idler pulley of the manually operated coupling means, said manually operated coupling means when pivoted about its mounting positioning the belt drive means selectively in driving contact with the pulley on the output shaft of the motive source at diametrically opposed points relative to the output shaft to impart selectively rotation in opposite directions from the output shaft to the jackshaft, and at least one drive wheel journaled on the frame and coupled to the jackshaft to he rotated thereby to move the implement, said coupling means being a lever member pivotally mounted at one extremity for movement about a pair of axes normal to one another and which mounts intermediate the extend of the same the idler pulley.

2. The wheeled implement of claim 1, in which the motive source is a gasoline engine having a unidirectionally rotated output shaft.

3. The wheeled implement of claim 2 in which the frame has a plurality of wheels at least two of which are drivingly connected to the jackshaft for simultaneous rotation.

4. The wheeled implement of claim 3 in which the lever member is journaled on the frame about one axis which is disposed parallel to the axis of the output shaft of the motive means and a second axis normal thereto.

5. The wheeled implement of claim 1 in which the frame includes a plurality of wheels at least a pair of which are journaled on the frame on a common axis and spaced apart the width of the frame and with means coupling said common wheels to the jackshaft to be driven thereby.

6. The wheeled implement of claim 5 and including a second jackshaft journaled on the frame and coupled to the first jackshaft in a nonslip-type coupling and including means coupling the second jackshaft to the pair of wheels and at least one additional wheel journaled on the frame.

7. The wheeled implement of claim 6 in which the frame includes an operator's seat disposed on the frame and over one of the wheels not common to the pair of wheels and aligned with the extent of the lever member such that the free extremity of the lever member is adapted to be accessible to an occupant of the seat.

8. The wheeled implement of claim 6 and including roller guide means positioned on the frame near the pair of wheels and adapted to guide the frame for movement.

9. The wheeled implement of claim 6 in which the nonslip-type coupling between the second drive shaft and the wheels connected thereto includes a chain drive positioned between sprockets mounted on the second jackshaft and the drive axles of the wheels.